(12) United States Patent
Berry et al.

(10) Patent No.: US 7,552,132 B2
(45) Date of Patent: *Jun. 23, 2009

(54) MANAGEMENT OF CONTRACT DATA

(75) Inventors: Kevin E. Berry, Raleigh, NC (US);
Troy N. Ganzer, Washingtonville, NY (US); Linda S. Mercer, Durham, NC (US); Leo D. Pudup, Wayne, NJ (US); Bianca U. Sillers, Raleigh, NC (US); Nestor Teodor-Mazilu, Wayne, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/968,249

(22) Filed: Jan. 2, 2008

(65) Prior Publication Data
US 2008/0103808 A1    May 1, 2008

Related U.S. Application Data

(63) Continuation of application No. 09/935,077, filed on Aug. 22, 2001, now Pat. No. 7,333,996.

(51) Int. Cl.
*G06F 17/30* (2006.01)

(52) U.S. Cl. .............................. 707/101; 707/2; 707/6; 707/10; 707/204

(58) Field of Classification Search ..................... 707/2, 707/3, 10, 101, 104.1, 204
See application file for complete search history.

(56) References Cited

U.S. PATENT DOCUMENTS

| | | | |
|---|---|---|---|
| 4,791,561 A | 12/1988 | Huber | |
| 4,805,099 A | 2/1989 | Huber | |
| 5,475,833 A | 12/1995 | Dauerer et al. | |
| 5,615,109 A | 3/1997 | Eder | |
| 5,692,206 A | 11/1997 | Shirley et al. | |
| 5,721,913 A | 2/1998 | Ackroff et al. | |
| 5,771,172 A | 6/1998 | Yamamoto et al. | |
| 5,870,717 A | 2/1999 | Wiecha | |
| 5,914,878 A | 6/1999 | Yamamoto et al. | |
| 5,953,707 A | 9/1999 | Huang et al. | |
| 6,151,582 A | 11/2000 | Huang et al. | |
| 7,065,496 B2* | 6/2006 | Subbloie et al. | 705/11 |
| 7,100,166 B2* | 8/2006 | Takatama et al. | 719/318 |
| 7,333,996 B2* | 2/2008 | Berry et al. | 707/101 |
| 7,412,403 B2* | 8/2008 | Subbloie et al. | 705/11 |
| 2006/0229935 A1* | 10/2006 | Subbloie et al. | 705/11 |
| 2007/0016514 A1* | 1/2007 | Al-Abdulqader et al. | 705/37 |

* cited by examiner

*Primary Examiner*—Jean M Corrielus
(74) *Attorney, Agent, or Firm*—Schmeiser, Olsen & Watts; Anna Linne

(57) ABSTRACT

A system for contract processing. Sent by a procurement contract management system (PCMS) to decentralized execution systems is a list of I identifiers identifying a contract dataset in the PCMS earmarked for archiving. The PCMS receives from each DES a return list of M of the I identifiers approved by each DES for archiving. A generated intersection list includes a logical intersection of the return lists received from the decentralized execution systems. If the intersection list is not empty, the PCMS archives each contract dataset identified in the list of I identifiers and appearing in the intersection list and communicates to each DES that the archiving was performed by the PCMS for the contract datasets appearing in the intersection list. If the intersection list is empty, the PCMS communicates to each DES that the archiving will not be performed.

12 Claims, 8 Drawing Sheets

PURCHASE ORDER
1. CONTRACT IDENTIFICATION
2. PURCHASER IDENTIFICATION
3. VENDOR IDENTIFICATION
4. PURCHASE ITEM(S)
5. QUANTITY OF EACH PURCHASE ITEM
6. DELIVERY DATA (PLACE, TERMS)
7. PRICE

*FIG. 5*

SCHEDULING AGREEMENT
1. CONTRACT IDENTIFICATION
2. PURCHASER IDENTIFICATION
3. VENDOR IDENTIFICATION
4. PURCHASE ITEM(S)
5. QUANTITY OF EACH PURCHASE ITEM
6. DELIVERY DATA (PLACE, TERMS)
7. DELIVERY SCHEDULE
8. PRICE

*FIG. 6*

MANAGEMENT OF CONTRACT DATA

This application is a continuation application claiming priority to Ser. No. 09/935,077, filed Aug. 22, 2001.

BACKGROUND OF THE INVENTION

1. Technical Field

The present invention relates to a system and method for managing contract data that is transferred between discrete contract management systems.

2. Related Art

An online financial software package known as Systems Applications and Products (SAP) includes software that can be used for managing contract data, but is inefficient for managing contract data that is transferred between discrete SAP systems. Accordingly, there is a need for an efficient system and method for managing contract data that is transferred between discrete SAP systems.

SUMMARY OF THE INVENTION

The present invention provides a method for managing contract data, comprising:

receiving a contract dataset by a decentralized execution system (DES) from a procurement contract management system (PCMS); and passing the contract dataset through a software filter that determines whether to store the contract dataset or a first portion thereof in a relational database of the DES, said relational database including contract datasets, vendor datasets, and purchase item datasets.

The present invention provides a method for updating an execution document relating to a contract, said method comprising:

having an execution document at a decentralized execution system (DES) of a procurement contract management system (PCMS), said execution document being derived from a contract dataset in the DES, said execution document having an existing attribute value for a purchase item in the contract dataset;

receiving notice at the DES from the PCMS of a new attribute value that is to replace the existing attribute value; and replacing the existing attribute value with the new attribute value in the execution document.

The present invention provides a method of contract archiving, comprising:

sending a list of I identifiers by a procurement contract management system (PCMS) to at least one decentralized execution system (DES), said I at least 1, each identifier of the I identifiers identifying a contract dataset in the PCMS earmarked by the PCMS for archiving;

receiving by the PCMS a return list of M of the I identifiers from each DES of the at least one DES in response to said sending, said M in a range of $0 \leq M \leq I$, said return list being DES-specific, each said contract dataset identified in the return list of each DES having been approved by said each DES for archiving; and archiving by the PCMS each contract dataset identified in the list of I identifiers and appearing in an intersection list of the return lists, if the intersection list is not empty.

The present invention provides a system for managing contract data, comprising software at a decentralized execution system (DES), said software adapted to:

receive a contract dataset by the DES from a procurement contract management system (PCMS); and pass the contract dataset through a software filter that is adapted to determine whether to store the contract dataset or a first portion thereof in a relational database of the DES, said relational database adapted to include contract datasets, vendor datasets, and purchase item datasets.

The present invention provides a system for updating an execution document relating to a contract, comprising a decentralized execution system (DES) of a procurement contract management system (PCMS), said DES having software adapted:

to have an execution document at the DES, said execution document being derived from a contract dataset in the DES, said execution document having an existing attribute value for a purchase item in the contract dataset;

to receive notice at the DES from the PCMS of a new attribute value that is to replace the existing attribute value; and to replace the existing attribute value with the new attribute value in the execution document.

The present invention provides a system for contract archiving, comprising a procurement contract management system (PCMS) having software adapted:

to send a list of I identifiers to at least one decentralized execution system (DES), said I at least 1, each identifier of the I identifiers identifying a contract dataset in the PCMS earmarked by the PCMS for archiving;

to receive a return list of M of the I identifiers from each DES of the at least one DES in response to having sent the list of I identifiers to each said DES, said M in a range of $0 \leq M \leq I$, said return list being DES-specific, each said contract dataset identified in the return list of each DES having been approved by said each DES for archiving; and to archive each contract dataset identified in the list of I identifiers and appearing in an intersection list of the return lists, if the intersection list is not empty.

The present invention provides an efficient system and method for managing contract data that is transferred between discrete SAP systems. The present invention also provides an automated and efficient system and method for contract archiving.

BRIEF DESCRIPTION OF THE DRAWINGS

FIG. 5 depicts entries that may appear in a purchase order, in accordance with embodiments of the present invention.

FIG. 6 depicts entries that may appear in a scheduling agreement, in accordance with embodiments of the present invention.

DETAILED DESCRIPTION OF THE INVENTION

Figure 1:
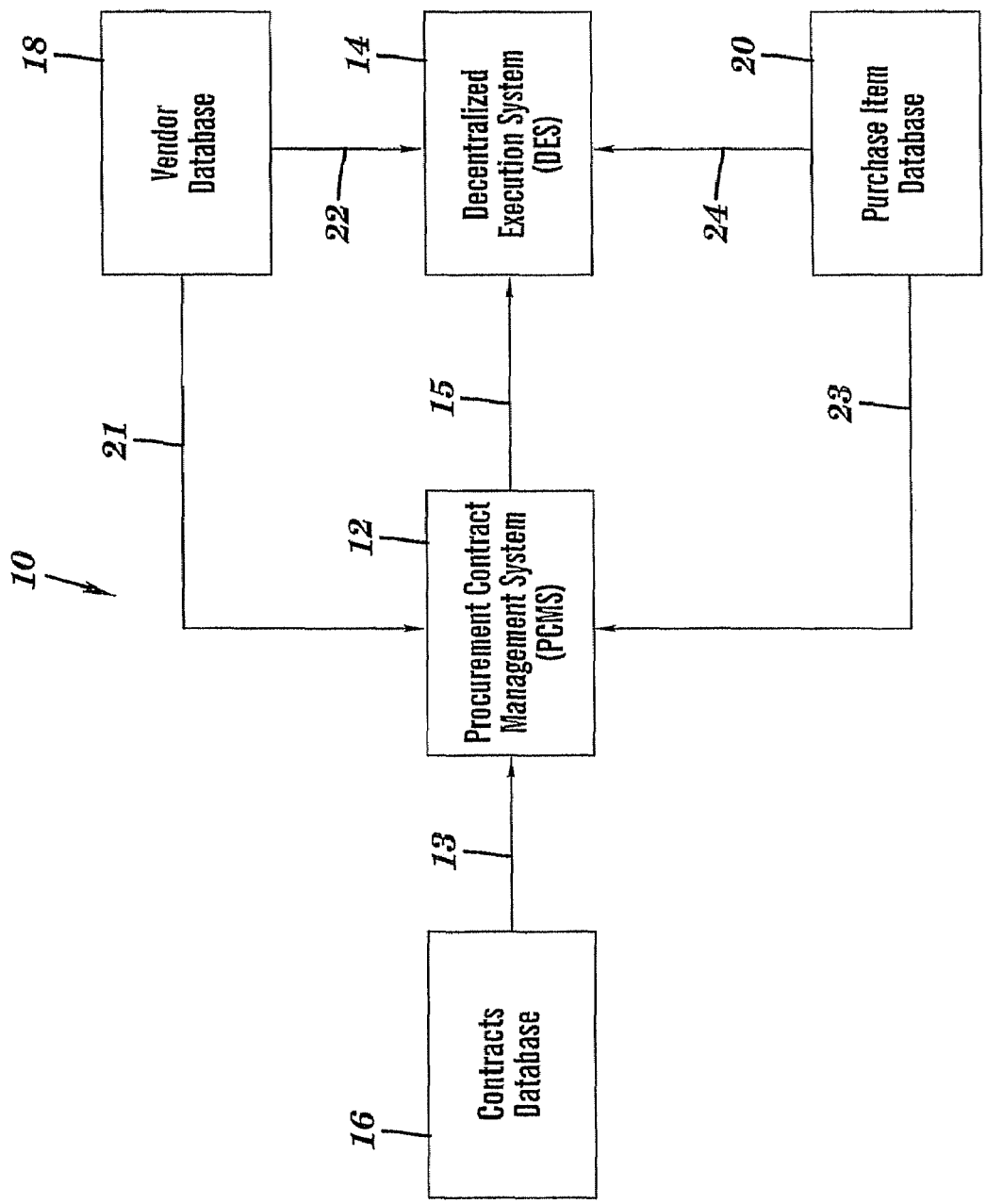
FIG. 1 is a block diagram of a contract management architecture that includes a decentralized execution system (DES) coupled to a procurement contract management system (PCMS), in accordance with embodiments of the present invention.

FIG. 1 is a block diagram of a contract management architecture 10 that includes a decentralized execution system (DES) 14 coupled to a procurement contract management system (PCMS) 12, in accordance with embodiments of the present invention. The PCMS 12 and the DES 14 may each independently be a Systems Applications and Products (SAP) system or a non-SAP system. Definitionally, a SAP system functions by executing SAP software.

The contract management architecture 10 manages contracts for the sale of goods (e.g., materials, devices, machines, vehicles, etc.) and services (e.g., service to repair, install, fabricate, advertise, etc.) for use by buyers of the goods and services. Such goods and services are called "purchase items." A contracts database 16 stores the contracts in their exact wording, while the PCMS 12 receives from the contracts database 16 selected information (e.g., vendor, purchase item(s), price, payment terms, termination date, etc.) relating to some or all of the contracts stored in the contracts database 16. The contract data stored in the PCMS 12 for each contract is called a "contract dataset." A "dataset" is defined herein as a collection of data, such as a database, one or more files of data, one or more tables of data, etc. A data path 13 between the contracts database 16 and the PCMS 12 may be electronic or manual.

The PCMS 12 serves as a master repository for contract data and feeds such contract data, as contracts are created and updated, to one or more DES such as the DES 14. Each DES serves to execute the functionality of selected contracts, such as to create and update execution documents (e.g., purchase orders, scheduling agreements, etc.) relating to the selected contracts. Thus the DES 14 requires data for those contracts that are active (i.e., being used or intended to be used) in the DES 14. The PCMS 12 feeds contract datasets to the DES 14 for such contracts that are active in the DES 14, but also for contracts that are not active in the DES 14. Since the DES 14 needs contract datasets only for its active contracts, the DES 14 selectively filters contract datasets received from the PCMS 12 and stores in its main relational database only contract data for its active contracts, as will be described infra. A data path 15 between the purchase the PCMS 12 and the DES 14 is electronic and computer automated. The data path 15 might represent a data communications network between PCMS 12 at a the central site and the DES 14 at a remote site. Definitionally, a data communications network comprises communication lines over which data is transmitted from one node to another, and each said node may include, inter alia, a computer, a terminal, a communication control unit, etc.

Each contract states a vendor (i.e., seller) and purchase items to be purchased by a named purchaser. Accordingly, the contract management architecture 10 includes a vendor database 18 and a purchase item database 20. The vendor database 18 is a master repository of vendors and stores, in vendor datasets, information about each vendor such as identification (e.g., a vendor number), name of vendor, address, telephone number, etc. The PCMS 12 receives from the vendor database 18 vendor information (i.e., vendor datasets) that pertain to the contract datasets stored within the PCMS 12. A data path 21 between the vendor database 18 and the PCMS 12 may be electronic or manual. The DES 14 receives from the vendor database 18 vendor information (i.e., vendor datasets) that relate to contracts that are active or may become active in the DES 14. A data path 22 between the vendor database 18 and the DES 14 may be electronic or manual.

The purchase item database 20 is a master repository of purchase items and stores, in purchase item datasets, information about each purchase item such as identification (e.g., a purchase item number) and characteristics (e.g., size, weight, color), descriptive text, etc. The PCMS 12 receives from the purchase item database 20 purchase item information (i.e., purchase item datasets) that pertain to the contract datasets stored within the PCMS 12. A data path 23 between the purchase item database 20 and the PCMS 12 may be electronic or manual. The DES 14 receives from the purchase item database 20 purchase item information (i.e., purchase item datasets) that relate to contracts that are active or may become active in the DES 14 A data path 24 between the purchase item database 20 and the DES 14 may be electronic or manual.

Figure 2:
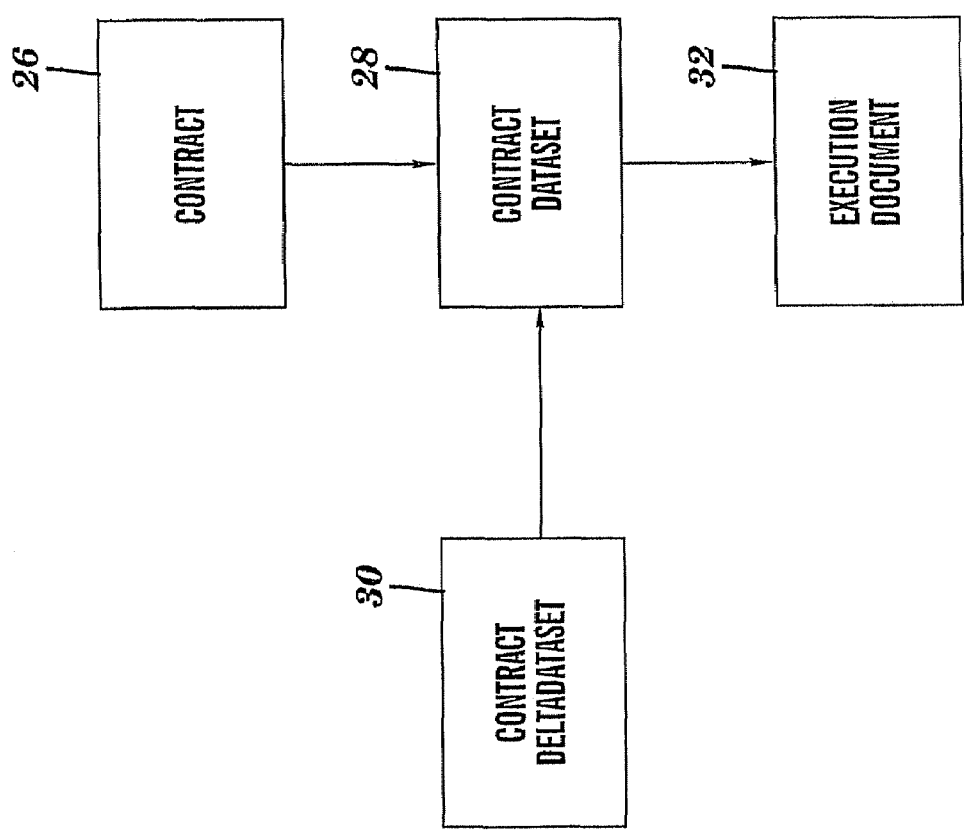
FIG. 2 depicts relationships between a contract, a contract dataset, a contract deltadataset, and an execution document, in accordance with embodiments of the present invention.

FIG. 2 depicts relationships between a contract 26, a contract dataset 28, a contract deltadataset 30, and an execution document 32, in accordance with embodiments of the present invention. A contract 26 for the sale of purchase items (i.e., goods or services), as used herein, is a legally binding agreement, in writing, between a purchaser and a vendor of the purchase items. The contract 26 consists of all of the words of the agreement. A contract dataset 28 is a collection of data comprising terms (e.g., vendor, purchaser, purchase item(s), price, payment terms, termination date, etc.) of the contract. The contract deltadataset 30 is a collection of data that updates an already existing contract dataset. The contract deltadataset 30 may include such information as added purchase items to an existing contract, a change in price or a new price of a purchase item in an existing contract, changes in delivery terms such as free on board (F.O.B.), free alongside (F.A.S.), change in payment terms, etc. The present invention processes added purchase items in the contract deltadataset 30 as discussed infra in accordance with FIG. 7. The present invention processes other changes such as new or changed prices of the contract deltadataset 30 as discussed infra in accordance with FIG. 8. The execution document 32 includes, inter alia, a purchase order, a scheduling agreement, etc. As seen in FIG. 2, the contract dataset 28 is derived from the contract 26 and is said to be keyed to the contract 26. The contract deltadataset 30 feeds the contract dataset 28 and is said to be keyed to the contract dataset 28. The execution document 32 is derived from the contract dataset 28.

Figure 3:
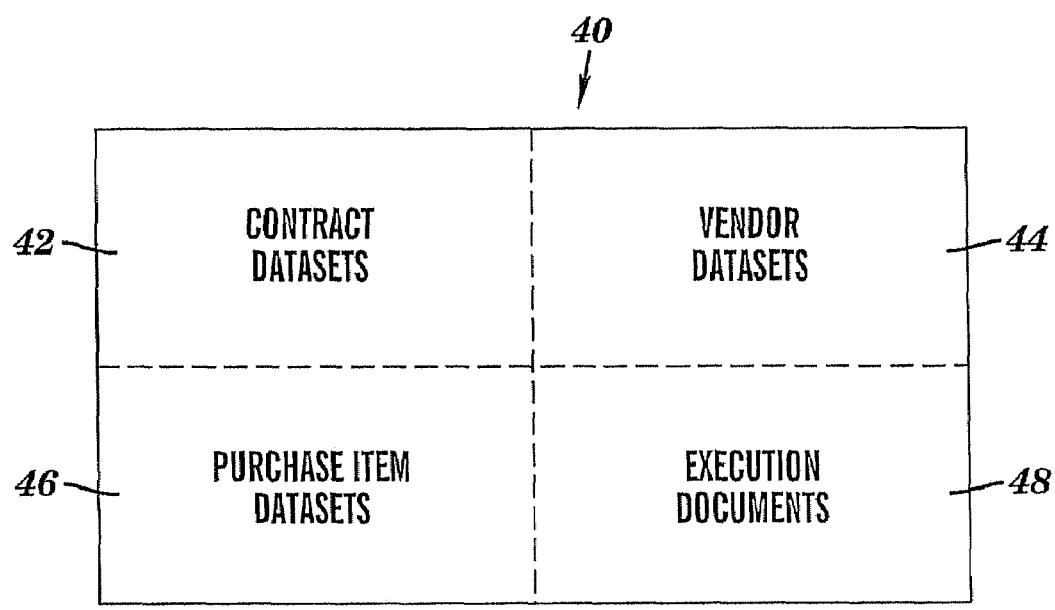
FIG. 3 depicts a layout of a relational database of the DES of FIG. 1, in accordance with embodiments of the present invention.

FIG. 3 depicts a layout of a relational database 40 of the DES 14 of FIG. 1, in accordance with embodiments of the present invention. In FIG. 3, the relational database 40 comprises contract datasets 42, vendor datasets 44, purchase item datasets 46, and execution documents, 48. If the DES 14 is a SAP system, then the relational database 40 is a SAP relational database, and if the DES 14 is a non-SAP system, then the relational database 40 is a non-SAP relational database. Definitionally, a SAP relational database is a relational database that functions under control of SAP software.

Figure 4:
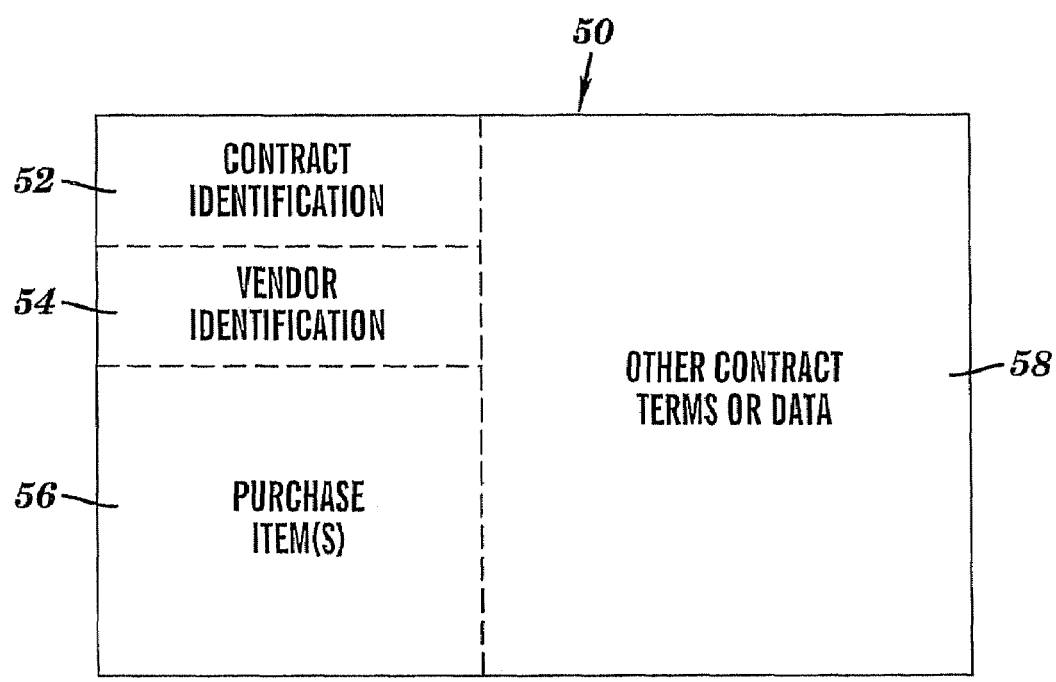
FIG. 4 depicts a layout of the contract dataset of FIG. 2, in accordance with embodiments of the present invention.

FIG. 4 depicts a layout of a contract dataset 50, such as the contract dataset 28 of FIG. 2, in accordance with embodiments of the present invention. In FIG. 4, the contract dataset 50 comprises a contract identification 52 (e.g., contract identification number), a vendor identification 54 (e.g., vendor identification number), purchase item(s) 56, and other contract terms or data 58.

Purchase orders and scheduling agreements are examples of execution documents. FIG. 5 depicts entries that may appear in a purchase order 60, in accordance with embodiments of the present invention. The price in a purchase order applies through the term (i.e., time period) of the contract. If the price is changed in accordance with a new or renewed contract (or for any other reason), the purchase order will be modified to incorporate the price change as described infra in conjunction with FIG. 8. FIG. 6 depicts entries that may appear in a scheduling agreement 62, in accordance with embodiments of the present invention. A scheduling agreement includes a schedule for delivering the purchase items bargained for buy the purchaser. If the price is determined by a price in effect at the time of delivery, then the scheduling agreement will be updated to reflect any change in price that occurs prior to delivery as described infra in conjunction with FIG. 8.

Figure 7:
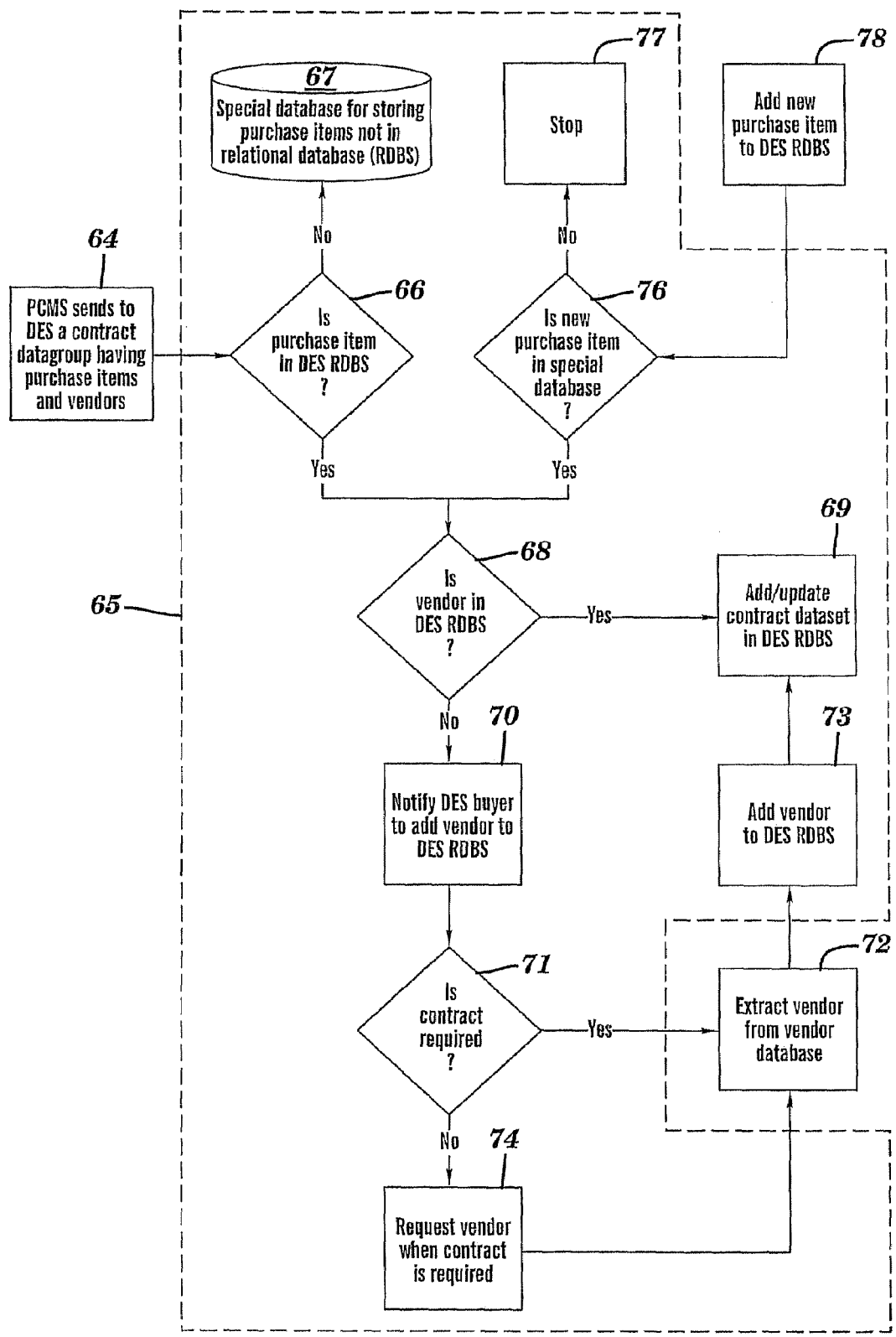
FIG. 7 is a flow chart for processing a new or updated contract dataset, in accordance with embodiments of the present invention.

FIG. 7 is a flow chart for DES software 65 (called "DES FILTER" software) that processes a "contract datagroup" received by the DES 14 from the PCMS 12 of FIG. 1, as denoted in block 64 and in accordance with embodiments of the present invention. A "contract datagroup" is defined herein as being either a contract dataset or a contract delta-dataset having new or changed purchase items. The DES software 65 also processes a new purchase item that is added to a relational database (RDBS) of the DES 14 as denoted in block 78. Although the DES FILTER software of the present invention does not currently exist in SAP, the scope of the present invention includes the DES FILTER software as either SAP software or non-SAP software. In relation to use of the DES FILTER software, the scope of the present invention includes the PCMS 12 and the DES 14 as each independently being a SAP system or a non-SAP system.

The DES software 65 is applicable to, inter alia, the following situation. If the PCMS 12 and the DES 14 of FIG. 1 are each a SAP system, then the PCMS 12 pushes all contract datagroups in its database into each such DES system to which the PCMS 12 is coupled. However, the DES 14 does not process or execute all contract datasets that exist in the PCMS 12, but only those contract datasets that are active in the DES 14. Thus, it would be inefficient and wasteful for the DES 14 to accept and store in its relational database 40 (see FIG. 3) all contract datagroups (or contents thereof) that the DES 14 receives from the PCMS 12. Accordingly, the DES software 65 selectively processes (i.e., filters) the datagroups received from the PCMS 12.

As stated supra, the DES 14 receives a contract datagroup $D_G$ from the PCMS 12 as indicated in block 64. The contract datagroup $D_G$ is either a contract dataset or a contract delta-dataset with one or more new purchase items. The contract datagroup $D_G$ identifies N purchase items (N≧1) that are purchasable from a vendor V keyed to the contract datagroup $D_G$ (i.e., identified in the contract as a vendor). If the contract datagroup $D_G$ is the contract dataset, then the contract datagroup $D_G$ identifies the vendor V. If the contract datagroup $D_G$ is the contract deltadataset, then the contract datagroup $D_G$ does not have to identify the vendor V, since the vendor V has been previously identified to the already-existing contract dataset. The DES 14 comprises the relational database 40 of FIG. 3 which includes the contract datasets 42, the vendor datasets 44 having vendors, and purchase item datasets 46 having purchase item(s). The relational database 40 may also include execution documents 48.

In FIG. 7, decision block 66 determines which, if any, of the N purchase items identified in the contract datagroup $D_G$ matches a purchase item in the purchase item datasets 46 stored in the DES relational database (DES RDBS) 40 (see FIG. 3). The decision block 66 also determines a total number K of such purchase items in $D_G$ that do not so match a purchase item in the purchase item datasets 46 of the DES RDBS 40 of FIG. 3. K is in a range of 0≦K≦N.

If K<N then a remaining N-K purchase items in $D_G$ are in the DES RDBS 40 and for the remaining N-K purchase items, the subsequent processing depends on whether the contract datagroup $D_G$ is the contract dataset or the contract delta-dataset. If the contract datagroup $D_G$ is the contract dataset, then the decision block 68 determines whether the vendor V matches a vendor in the vendor datasets 44 (see FIG. 4). If the vendor V so matches a vendor in the vendor datasets 44, then block 69 adds a subset of $D_G$ to the contract datasets 42 of the relational database 40. This subset of $D_G$ is the remaining N-K purchase items in $D_G$ formed by excluding the K purchase items from $D_G$. For K>0, the K purchase items are not stored in the relational database 40, since the K purchase items do not exist in the purchase item datasets 46 (see FIG. 3), as discussed supra. If K>0 then the K purchase items not in the purchase item datasets 46 may be stored in a special database of the DES 14, as denoted in block 67. The special database stores contract datasets having one or more purchase items not currently present in the purchase item datasets 46. The contract datasets stored in the special database may be subsequently used to update the contract datasets 42 of the relational database 40 when a new matching purchase item is added in the future to the purchase item datasets 46, as will be explained infra in conjunction with block 78. Although the special database of the present invention does not currently exist in SAP, the scope of the present invention includes the special database as either a SAP database or a non-SAP database.

Returning to the decision block 66 for the case of K<N, the alternative situation of the contract datagroup $D_G$ being the contract deltadataset will now be considered. The contract deltadataset includes N-K purchase items that exist in the purchase items database 46 in relation to a contract dataset $D_1$, wherein $D_1$ currently exists the contract datasets 42 (see FIG. 3). Thus, the contract deltadataset is said to be keyed to $D_1$. Since $D_1$ is a pre-existing contract dataset with an already-identified vendor, the decision block 68 is bypassed and the block 69 is executed next, which adds to $D_1$ the remaining N-K purchase items of the contract datagroup $D_G$. If K>0, then the K purchase items not in the purchase item datasets 46 may be stored in the special database of the DES 14, as denoted in the block 67 as follows. If $D_G$ is keyed to a contract dataset D' in the special database (i.e., if $D_G$ has a contact identification that matches the contract identification of the contract dataset D' in the special database), then the K purchase items of $D_G$ are added to D'. If $D_G$ is not keyed to any contract dataset in the special database, then a new contract dataset $D_{C1}$ is formed from $D_G$ such that $D_{C1}$ includes the K purchase items of $D_G$ and excludes the remaining N-K purchase items of $D_G$, and $D_{C1}$ is then added to the special database.

Returning to the decision block 66, the case of K=N is now considered. If K=N, then no purchase item in the contract datagroup $D_G$ matches a purchase item in the purchase item datasets 46 stored in the DES RDBS 40 (see FIG. 3). Thus, no portion of the contract datagroup $D_G$ is added to the DES RDBS 40, since none of the purchase item in $D_G$ exist in the DES 14. Instead, the K purchase items not in the purchase item datasets 46 may be stored in the special database of the DES 14, as denoted in the block 67 as follows. If $D_G$ is keyed to a contract dataset D" in the special database, then the N purchase items of $D_G$ are added to D". If $D_G$ is not keyed to any contract dataset in the special database, then a new contract dataset $D_{C2}$ is formed from $D_G$ such that $D_{C2}$ includes the N purchase items of $D_G$, and $D_{C2}$ is then added to the special database.

Returning to block 68 (which is pertinent only if the contract datagroup $D_G$ is the contract dataset and is not pertinent if the contract datagroup $D_G$ is the contract deltadataset), if the vendor V does not match a vendor in the vendor datasets 44 of the DES RDBS 40 (see FIG. 3) then a vendor dataset $D_V$ may be added to the vendor datasets 44 of the DES RDBS 40 (see FIG. 3) when a contract based on one or more of the remaining N-K purchase items of $D_G$ is required at the DES 14 (i.e., required due to a need to purchase the one or more of the remaining N-K purchase items of $D_G$ at the DES 14), wherein the vendor dataset $D_V$ is keyed to the vendor V (i.e., includes the vendor V). A manner of adding $D_V$ to the vendor datasets 44 is shown in blocks 70-73 of FIG. 7. In block 70, a DES buyer is sent a message relating to adding $D_V$ to the vendor datasets 44 of the RDBS 40. The DES buyer is keyed to (i.e., authorized to purchase) at least one purchase item of the remaining N-K purchase items. As shown in decision block 71, the DES buyer queries whether the contract based on one or more of the remaining N-K purchase items of $D_G$ is required at the DES 14. If the answer to the query is YES, then the DES buyer may cause $D_V$ to be added to the vendor V datasets 44 by extracting the vendor V from the vendor database 18 (see FIG. 1) as indicated in block 72, followed by adding the vendor V to the vendor datasets 44 as indicated in block 73. If the answer to the query is NO, then the DES buyer waits and requests the vendor V at a time in the future when a contract based on one or more of the remaining N-K purchase items of $D_G$ becomes required at the DES 14 (see block 74), followed by execution of blocks 72 and 73 described supra. Although blocks 70-73 describe a process for adding $D_V$ to the vendor datasets 44, any method that would be obvious to one of ordinary skill in the art may be used for adding $D_V$ to the vendor datasets 44. After the vendor V is added to the vendor datasets 44 as indicated in block 73, the subset of $D_G$ comprising the remaining N-K purchase items in $D_G$ is added to the contract datasets 42 in the RDBS 40 as indicated in block 69.

Block 78 of FIG. 7 illustrates how the DES software 65 processes a new purchase item that has been added to the purchase item datasets 46 of the DES RDBS 40 (see FIG. 3). The new purchase item may be derived from the purchase item database 20 of FIG. 1. As discussed supra in conjunction with block 67 of FIG. 7, the special database of the DES 14 (see FIG. 1) may be used to store contract datasets for purchase items received (see block 64) from the PCMS 12 (see FIG. 1) wherein such purchase items are not in the purchase item datasets 46. Thus, if a new purchase item is subsequently added to the purchase item datasets 46, as indicated in block 78, then block 76 asks whether the new purchase item exists in a contract dataset $D_{CS}$ of the special database. If the new purchase item does not exist in a contract dataset $D_{CS}$ of the special database, then processing for the new purchase item ceases as indicated in block 77.

However, if in response to the query in block 76, $D_{CS}$ exists such that the new purchase item is identified in $D_{CS}$, and if $D_{CS}$ identifies a total of J purchase items ($J \geq 1$), then block 68 determines whether a vendor identified in $D_{CS}$ matches a vendor in the vendor datasets 44 (see FIG. 3). If the vendor identified in $D_{CS}$ so matches a vendor in the vendor datasets 44 then the contract datasets 42 (see FIG. 3) are updated with purchase item data in $D_{CS}$ as follows. If a contract identifier of $D_{CS}$ matches a contract identifier of a contract dataset $D_{CR}$ in the relational database 40 (see FIG. 3) then the new purchase item is added to the contract dataset $D_{CR}$. However, if the contract identifier of $D_{CS}$ does not matches a contract identifier of any contract dataset in the relational database 40 then a subset of $D_{CS}$ is added to the relational database, wherein the subset of $D_{CS}$ includes the new purchase item. Additionally, if J=1 then $D_{CS}$ is deleted from the special database, but if J>1 then the new purchase item is deleted from $D_{CS}$.

Returning to the path of blocks 78, 76, and 68, if the vendor identified in $D_{CS}$ does not match any vendor in the vendor datasets 44 (see FIG. 3), then the new purchase item is further processed in the same manner as was described supra for a purchase item in a contract dataset introduced into the DES 14 via the path of blocks 64 and 68, and is thus further processed in accordance with blocks 70-73, and 69 as described supra.

In summary, a contract dataset sent to the DES 14 by the PCMS 12 (see FIG. 1) as shown in block 64 of FIG. 7 passes through a software filter provided by the "DES FILTER" software. The filter functionality provided in blocks 66 and 68. Additional filter functionality is provided in block 76 for new purchase items. The software filter functionality determines whether to store the contract dataset being filtered (or a first portion thereof) in the relational database 40 (see FIG. 3) of the DES 14. The software filter functionality further determines whether to store the contract dataset being filtered (or a portion thereof) in the special database of the DES 14. In an embodiment of the software filter functionality, the DES 14 is a first SAP contract management system, the PCMS 12 is a second SAP contract management system, the relational database 40 is a SAP database, the software filter is a non-SAP software filter, and the special database is a non-SAP database.

Figure 8:
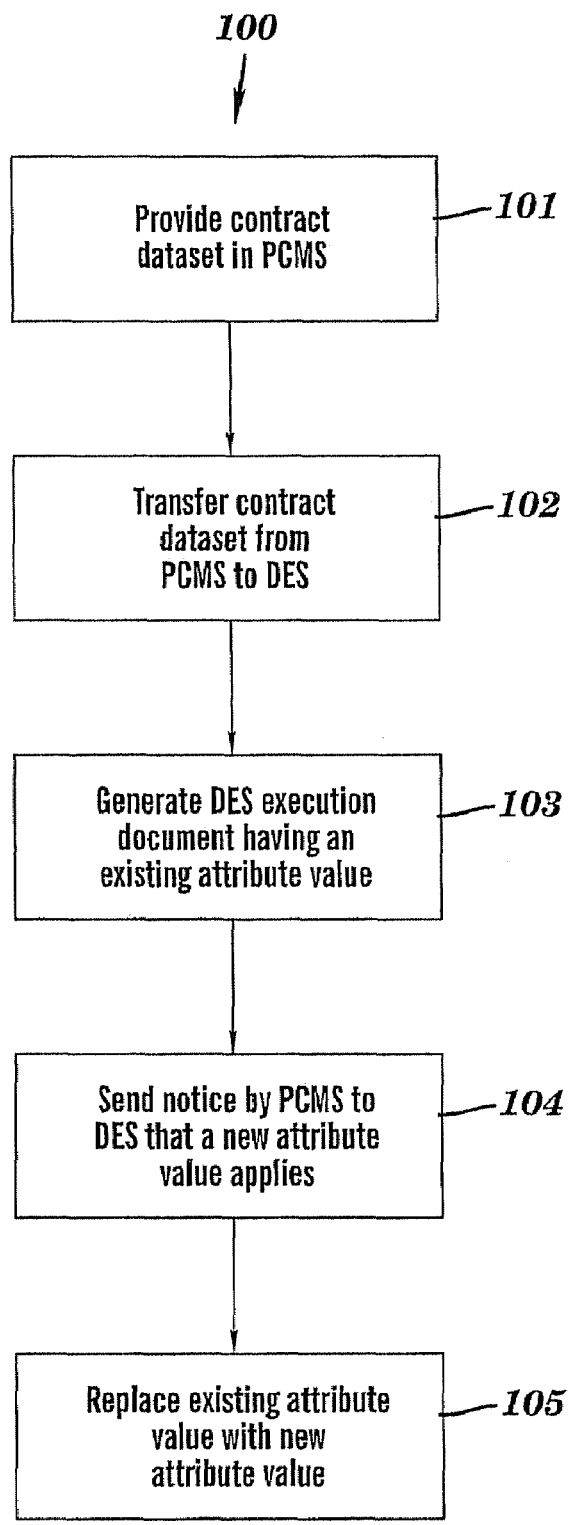
FIG. 8 is a flow chart for updating an execution document, in accordance with embodiments of the present invention.

FIG. 8 is a flow chart 100 of DES software (called "DES UPDATE" software) for updating an execution document 32 of FIG. 2, in accordance with embodiments of the present invention. The execution document 32 includes, inter alia, a purchase order (see FIG. 5), a scheduling agreement (see FIG. 6), etc. As an example of updating a purchase order, the existing price is changed to a new price in accordance with a new or renewed contract (or for any other reason), the purchase order will be modified to incorporate the price change. The new price typically replaces the existing price in the purchase order not before the new price becomes effective for the contract. As an example of updating a scheduling agreement in which the price paid by the purchaser is the price in effect at the time of delivery of purchase item(s), then the scheduling agreement will be updated to reflect any change in price that occurs prior to delivery.

Generally, an "attribute value" is updated in an execution agreement in accordance with the present invention. An attribute value in an execution document is a contract parameter value in the execution document. Examples of attribute values include, inter alia, a price of a purchase item, delivery terms (e.g., F.O.B., F.A.S.), financing terms, etc.

As seen in FIGS. 2-3, the execution document 32 is derived from the contract dataset 28 of the contract datasets 42 of the DES RDBS 40. The execution document 32 may have been generated in a sequence described by blocks 101-103 of FIG. 8. In block 101, the contract dataset 28 is shown to originate in the PCMS 12 (see FIG. 1). Block 102 shows the contract dataset 28 transferred from the PCMS 12 to the DES 14 (see FIG. 1) as discussed supra in conjunction with the block 64 of FIG. 7. Alternatively, the contract dataset 28 may have been placed or generated in the DES 14 in any other manner such as from a process sequence of adding a new purchase item to the RDBS 40 of the DES 14 as described supra in conjunction with the process sequence starting with block 78 of FIG. 7. Block 103 in FIG. 8 depicts generation of the execution agreement in the DES 14 such that the execution agreement has an existing attribute value. Block 104 of FIG. 8 indicates that the DES 14 receives notice from the PCMS 12 that a new attribute value is now effective; i.e., that the contract dataset 28 has been modified to include the new attribute value for the associated purchase item. Accordingly, block 105 replaces the existing attribute value in the execution document with the new attribute value.

Although the DES UPDATE software of the present invention does not currently exist in SAP, the scope of the present invention includes the DES UPDATE software as either SAP software or non-SAP software. In relation to use of the DES UPDATE software, the scope of the present invention includes the PCMS 12 and the DES 14 as each independently being a SAP system or a non-SAP system.

Figure 9:
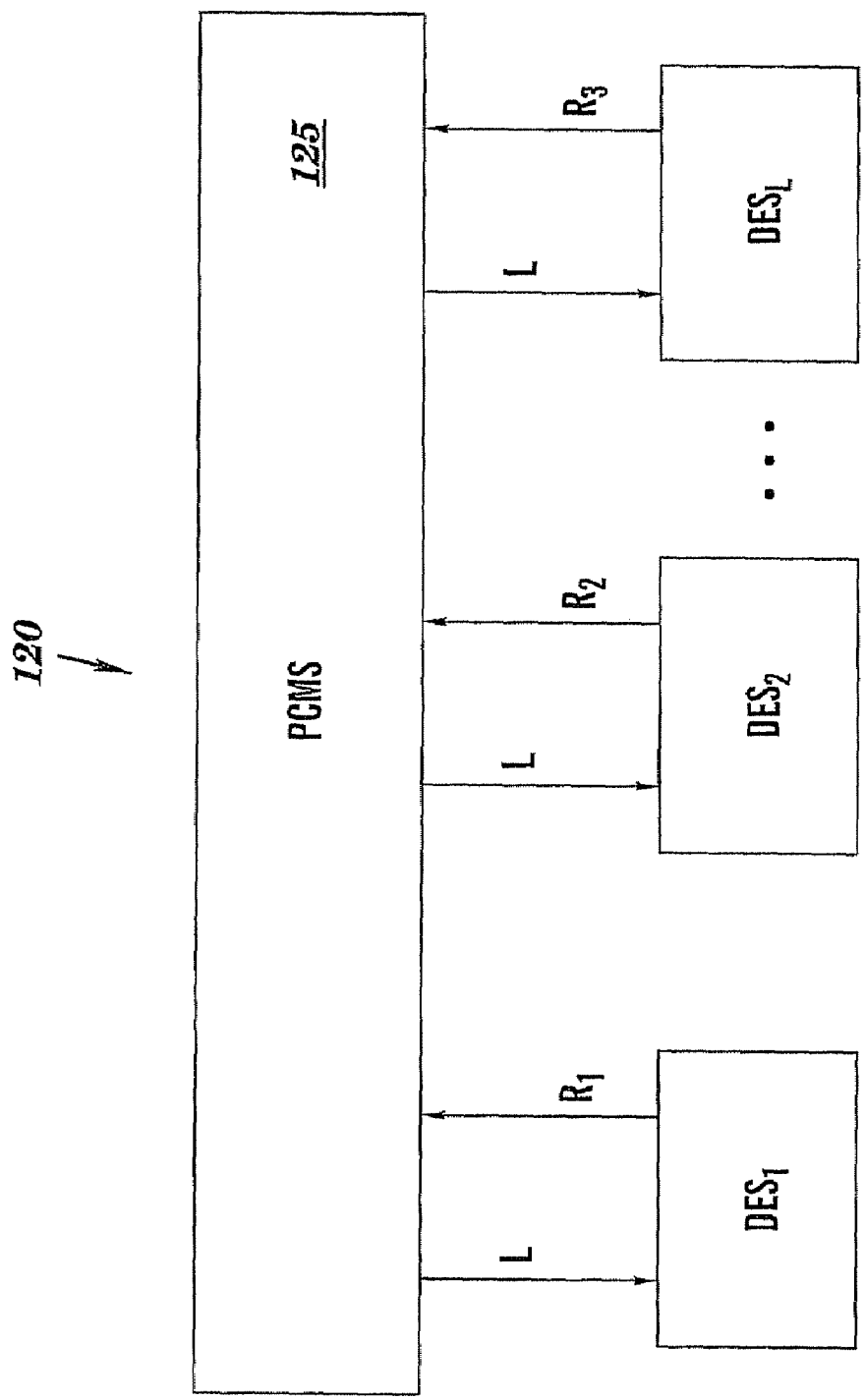
FIG. 9 depicts archiving a contract, in accordance with embodiments of the present invention.

FIG. 9 depicts archiving a contract, in accordance with embodiments of the present invention. FIG. 9 shows a contract management architecture 120 comprising a PCMS 125 and X DES's, namely $DES_1, DES_2, \ldots, DES_X$ wherein $X \geq 1$. The contract management relationships between the PCMS 12 and DES 14 of FIG. 1, as described supra, apply to the PCMS 125 and $DES_1, DES_2, \ldots, DES_X$ of FIG. 9. The PCMS 125 desires to archive (i.e., delete or store elsewhere) I contract datasets ($I \geq 1$). Before actually implementing the archiving, the PCMS 125 requires unanimous approval of the archiving from all of $DES_1, DES_2, \ldots, DES_X$ for each contract dataset to be archived. Accordingly, the PCMS 125 sends a list L of I identifiers to each of $DES_1, DES_2, \ldots, DES_X$. Each of the I identifiers identifies a contract dataset in the PCMS 125 earmarked by the PCMS 125 for archiving. After receiving the list L, each of $DES_1, DES_2, \ldots, DES_X$ responds to the PCMS 125 by sending a return list $R_1, R_2, \ldots, R_X$, respectively. The return lists are DES-specific; i.e., $R_1, R_2, \ldots, R_X$ are independent of one another and are specific to $DES_1, DES_2, \ldots, DES_X$, respectively. The return list sent by $DES_i$ includes M of the I identifiers ($0 \leq M_i \leq I$) for $i=1, 2, \ldots, I$. Each contract dataset identified in the return list of $DES_i$ is approved by $DES_i$ for archiving, for $i=1, 2, \ldots, I$.

After receiving all of the return lists, the PCMS 125 generates an intersection list from $R_1, R_2, \ldots, R_X$. The intersection list is a logical intersection of $R_1, R_2, \ldots, R_X$; i.e., the intersection list contains those contract datasets that are common to each of $R_1, R_2, \ldots, R_X$. Accordingly, each contract dataset on the intersection list appears on each return list $R_1, R_2, \ldots, R_X$. The PCMS 125 archives each contract dataset appearing on the intersection list. Note that the intersection list may be empty (i.e., have no contract datasets therein). If the intersection list is empty, then no contract datasets are archived.

The PCMS 125 has software (called "PCMS ARCHIVE" software) for implementing FIG. 9; i.e.,: for preparing and sending the list L to each of $DES_1, DES_2, \ldots, DES_X$, for receiving $R_1, R_2, \ldots, R_X$ and generating the intersection list, and for archiving the contract datasets appearing on the intersection list. Although the PCMS ARCHIVE software of the present invention does not currently exist in SAP, the scope of the present invention includes the PCMS ARCHIVE software as either SAP software or non-SAP software. In relation to use of the PCMS ARCHIVE software, the scope of the present invention includes the PCMS 12 and the DES 14 as each independently being a SAP system or a non-SAP system.

Each of $DES_1, DES_2, \ldots, DES_X$ has software (called "DES ARCHIVE" software) to receive the list L, prepare its return list, and send its return list to the PCMS 125. Although the DES ARCHIVE software of the present invention does not currently exist in SAP, the scope of the present invention includes the DES ARCHIVE software as either SAP software or non-SAP software. In relation to use of the DES ARCHIVE software, the scope of the present invention includes the PCMS 12 and the DES 14 as each independently being a SAP system or a non-SAP system.

Figure 10:
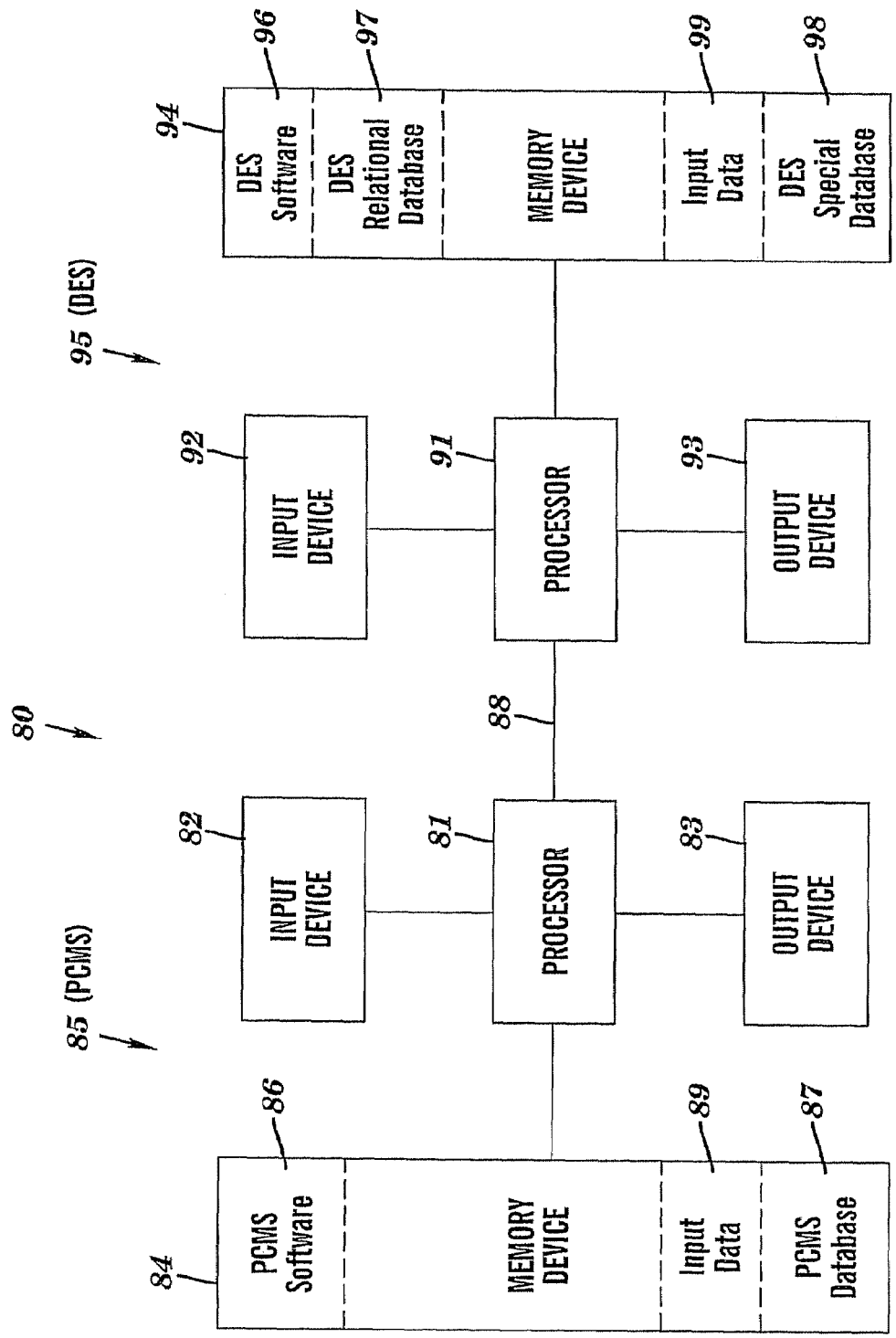
FIG. 10 is a block diagram of a computer configuration for the contract management architecture of FIG. 1, in accordance with embodiments of the present invention.

FIG. 10 is a block diagram of a computer configuration for the contract management architecture of FIG. 1 and the systems, databases, software, etc, of FIGS. 2-9, in accordance with embodiments of the present invention. FIG. 10 illustrates a computer network 80 comprising a PCMS 85 and a DES 95. The PMS 85 and the DES 95 communicate over a data path 88 such as communications network described supra in conjunction with the data path 15 of FIG. 1. The DES 95 represents one or more of such DES's which are linked to the PCMS 85.

The PCMS 85 includes a processor 81, an input device 82 (representing at least one input device) coupled to the processor 81, an output device 83 (representing at least one output device) coupled to the processor 81, and a memory or storage device 84 (representing at least one memory or storage device) coupled to the processor 81. The input device 82 may be, inter alia, a keyboard, a mouse, etc. The output device 83 may be, inter alia, a printer, a plotter, a computer screen, a magnetic tape, a removable hard disk, a floppy disk, etc. The memory or storage device 84 may be, inter alia, a hard disk, an optical disk, a dynamic random access memory (DRAM), a read-only memory (ROM), etc. The memory or storage device 84 stores the PCMS software 86 and a PCMS database 87. The PCMS software 86 includes all PCMS software discussed herein (e.g., the "PCMS ARCHIVE" software discussed supra in conjunction with FIG. 9). The processor 81 executes the PCMS software 86. The memory or storage device 84 includes input data 89 for the PCMS software 86. The output device 83 displays output from the PCMS software 86. Additionally, the output device 83 may be used to display output, source code, graphics, etc.

The DES 95 includes a processor 91, an input device 92 (representing at least one input device) coupled to the processor 91, an output device 93 (representing at least one output device) coupled to the processor 91, and a memory or storage device 94 (representing at least one memory or storage device) coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory or storage device 94 may be, inter alia, a hard disk, an optical disk, a dynamic random access memory (DRAM), a read-only memory (ROM), etc. The memory or storage device 94 stores the DES software 96, the DES relational database 97, the DES special database 98, and input data 99 for the DES software 96. The DES software 96 includes all DES software discussed herein (e.g., the DES FILTER software, the DES UPDATE software, and the DES ARCHIVE software discussed supra in conjunction with FIGS. 7, 8, and 9, respectively). The processor 91 executes the DES software 96. The output device 93 displays output from the DES software 96. Additionally, the output device 93 may be used to display output, source code, graphics, etc.

While FIG. 10 shows the computer network 80 as a particular configuration of hardware and software, any configuration of hardware and software, as would be known to a person of ordinary skill in the art, may be utilized for the purposes stated supra in conjunction with the particular computer network 80 of FIG. 11. For example, the DES relational database 97 and the DES special database 98 may be in the same or different memory or storage devices. As another example, the individual DES software components (e.g., the DES FILTER software, the DES UPDATE software, and the DES ARCHIVE software) may be in the same or different memory or storage devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A system for managing contract data, said system comprising a processor configured to execute software at a decentralized execution system (DES), said software when executed by the processor causes the processor to perform a method, said method comprising:

receiving a contract datagroup $D_G$ by a decentralized execution system (DES) from a procurement contract management system (PCMS) over a data path within a computer network, said contract datagroup $D_G$ selected from the group consisting of a contract dataset and a contract deltadataset, said contract datagroup $D_G$ identifying N purchase items purchasable from a vendor V keyed to the contract datagroup $D_G$, said N being an integer of at least 2, said contract datagroup $D_G$ identifying the vendor V if the contract datagroup $D_G$ is the contract dataset, said DES comprising a relational database that includes contract datasets, vendor datasets having vendors, and purchase item datasets having purchase items;

determining which, if any, of the N purchase items identified in the contract datagroup $D_G$ match a purchase item in the purchase item dataset and determining a total number K of such purchase items $D_G$ that do not so match a purchase item in the purchase item datasets, said K being an integer satisfying 0<K<N;

if the contract datagroup $D_G$ is the contract dataset then determining that the vendor V matches a vendor in the vendor datasets and adding a subset of $D_G$ to the relational database, said subset of $D_G$ excluding the K purchase items $D_G$;

if the contract datagroup $D_G$ is the contract deltadataset then adding to the first contract dataset in the relational database R purchase items of $D_G$, wherein $D_G$ is keyed to a first contract dataset in the relational database, and wherein the R purchase items of $D_G$ consist or all purchase items of $D_G$ exclusive of the K purchase items of $D_G$.

2. The system for managing contract data of claim 1, wherein the DES comprises a special database that includes contract datasets, wherein the contact datagroup $D_G$ is the contract deltadataset, and wherein K>0 and said method further comprises:

if $D_G$ keyed to a first contract dataset in the special database, then adding to the first contract dataset in the special database the K purchase items $D_G$; and if $D_G$ is not keyed to any contract dataset in the special database, then forming from $D_G$ a contract dataset $D_{C1}$ that includes the K purchase items and excludes the R purchase items, and adding $D_{C1}$ to the special database.

3. The system for managing contract data of claim 1, wherein the contract datagroup $D_G$ is the contract dataset and the vendor V dues not match a vendor in the vendor datasets, and wherein the method further comprises:

adding a vendor dataset $D_v$ to the relational database when a contract based on the subset of $D_G$ is required at the DES, said vendor dataset $D_v$ keyed to the vendor V.

4. The system for managing contract data of claim 3, wherein said software is configured to have the vender dataset $D_v$ extracted from a vendor database prior to having $D_v$ added to the relational database.

5. The system for managing contract data of claim 3, wherein said adding $D_v$ to the relational database comprises:

communicating a message to a DES buyer keyed to at least one purchase item of the R purchase items, each of said at least one purchase item matching a purchase item in the purchase item database, said message relating to adding $D_v$ to the relational database; and having the DES buyer cause $D_v$ to be added to the relational database when the contract based on the subset of $D_G$ is required at the DES.

6. The system for managing contract data of claim 1, wherein the contract datagroup $D_G$ is the contract dataset.

7. The system for managing contract data of claim 1, wherein the contract datagroup $D_G$ is the contract deltadatset.

8. The system for managing contract data of claim 1, said PCMS being a systems applications and products (SAP) system, said DES being a SAP system, said relational database being a SAP database, said software being non-SAP software.

9. A system for managing contract data, said system comprising a processor configured to execute software at a decentralized execution system (DES), said software when executed by the processor causes the processor to perform a method, said method comprising:

receiving a contract dataset $D_C$ by a decentralized execution system (DES) from a procurement contract management system (PCMS) over a data path within a computer network, said contract dataset $D_C$ identifying a vendor V and N purchase items purchasable from the vendor V, said N being an integer of at least 1, said DES comprising a relational database that includes contract datasets, vendor datasets having vendors, and purchase item datasets having purchase items, said DES further comprising a special database that includes contract datasets;

determining which, if any, of the N purchase items identified in the contract dataset $D_C$ match a purchase items in the purchase item datasets and determining a total number K of such purchase items in $D_C$ that do not so match a purchase item in the purchase item datasets, said K being an integer satisfying $0 \leq K \leq N$;

if K=N then adding $D_C$ to the special database;

if K<N then determining that the vendor V matches a vendor In the vendor datasets and adding a first subset of $D_C$ to the relational database and if K>0 adding a second subset of $D_C$ to the contract datasets of the special database, said first subset of $D_C$ excluding the K purchase items from $D_C$, said second subset of $D_C$ excluding R purchase items from $D_C$, wherein the R purchase items of $D_C$ consist of all purchase items of $D_C$ exclusive of the K purchase items of $D_C$.

10. The system for managing contract data of claim 9, said method further comprising:

adding a new purchase item to the purchase item datasets;

determining whether the new purchase item is identified in a contract dataset $D_{CS}$ of the special database; and if the new purchase item is so identified in $D_{CS}$ and $D_{CS}$ identifies J purchase items such that J is an integer of at least 1, then determining whether a vendor identified in $D_{CS}$ matches a vendor in the vendor datasets and if the vendor identified in $D_{CS}$ so matches a vendor in the vendor datasets then:

if a contract identifier of $D_{CS}$ matches a contract identifier of a first contract dataset in the relational database then adding the new purchase item to the first contract dataset, else if the contract identifier of $D_{CS}$ does not matches a contract identifier of any contract dataset in the relational database then adding a subset of $D_{CS}$ to the relational database, said subset of $D_{CS}$ including the new purchase item; and if J−1 then deleting $D_{CS}$ from the special database else deleting the new purchase item from $D_{CS}$.

11. The system for managing contract data of claim 10, wherein said software is f adapted to extract the new purchase item from a purchase item database prior to adding the new purchase item to the purchase item datasets.

12. The system for managing contract data of claim 9, said PCMS being a systems applications and products (SAP) system, said DES being a SAP system, said relational database being a SAP database, said special database being a non-SAP database, said software being non-SAP software.

* * * * *